(12) United States Patent
Sentosa et al.

(10) Patent No.: US 10,642,264 B2
(45) Date of Patent: May 5, 2020

(54) SECURITY DRONE SYSTEM

(71) Applicant: Superior Communications, Inc., Irwindale, CA (US)

(72) Inventors: Samuel Sentosa, Rancho Cucamonga, CA (US); Geroge Chen, Chatsworth, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 0 days.

(21) Appl. No.: 15/654,614

(22) Filed: Jul. 19, 2017

(65) Prior Publication Data
US 2019/0025822 A1    Jan. 24, 2019

(51) Int. Cl.
*G08G 5/00*    (2006.01)
*G05D 1/00*    (2006.01)
(Continued)

(52) U.S. Cl.
CPC ......... *G05D 1/0038* (2013.01); *G05D 1/0027* (2013.01); *G06K 9/00637* (2013.01); *G06K 9/00664* (2013.01); *G06K 9/00771* (2013.01); *G07C 5/008* (2013.01); *G08B 13/19602* (2013.01); *G08B 15/00* (2013.01); *G08B 25/08* (2013.01); *G08B 25/10* (2013.01); *G08C 17/02* (2013.01); *G08G 5/006* (2013.01); *G08G 5/0013* (2013.01); *G08G 5/0026* (2013.01);
(Continued)

(58) Field of Classification Search
CPC ........... G06K 9/00637; G06K 9/00664; G06K 9/00771; G07C 5/008; G08G 5/0026; G08G 5/052; G08G 5/006; G08G 5/0069; G08G 5/0078; G08G 5/0089; G08G 5/045; H04L 65/4092; H04L 67/125; B64C 39/024; B64C 2201/00; B64C 2201/12; B64C 2201/123; B64C 2201/126; B64C 2201/127; B64C 2201/128; B64C 2201/14; B64C 2201/141; B64C 2201/146; F21V 23/0442
USPC .................................. 701/437, 3, 1, 22, 400
See application file for complete search history.

(56) References Cited

U.S. PATENT DOCUMENTS 9,508,263 B1 * 11/2016 Teng ..................... B64C 39/024
9,622,133 B1 * 4/2017 Guvenc ................. H04W 36/20
(Continued)

OTHER PUBLICATIONS

U.S. Appl. No. 62/447,256, filed Jan. 2017, Rezvani, Babak.*

*Primary Examiner* — Richard A Goldman
(74) *Attorney, Agent, or Firm* — Snell & Wilmer LLP

(57) ABSTRACT

A security drone includes a drone housing defining a cavity and an actuator coupled to the drone housing and designed to move the drone housing through the predetermined area. The security drone further includes a camera designed to detect image data corresponding to the predetermined area and a network access device designed to transmit and receive data via a network. The security drone further includes a drone processor positioned within the cavity and coupled to the actuator, the camera, and the network access device. The drone processor is designed to control the actuator to move the drone housing through the predetermined area, identify a potential threat in the predetermined area based on the image data as the drone housing is moved through the predetermined area, and transmit potential threat data corresponding to the potential threat to a remote device when the potential threat is identified.

20 Claims, 14 Drawing Sheets

(51) Int. Cl.
  *G06K 9/00* (2006.01)
  *G07C 5/00* (2006.01)
  *G08C 17/02* (2006.01)
  *G08G 5/04* (2006.01)
  *G08B 13/196* (2006.01)
  *G08B 25/10* (2006.01)
  *G08B 25/08* (2006.01)
  *G08B 15/00* (2006.01)
  *H04L 29/06* (2006.01)
  *H04L 29/08* (2006.01)

(52) U.S. Cl.
  CPC ......... *G08G 5/0052* (2013.01); *G08G 5/0069* (2013.01); *G08G 5/0078* (2013.01); *G08G 5/0086* (2013.01); *G08G 5/045* (2013.01); *H04L 65/4092* (2013.01); *H04L 67/125* (2013.01)

(56) References Cited

U.S. PATENT DOCUMENTS

| | | | | |
|---|---|---|---|---|
| 9,629,220 | B2* | 4/2017 | Panopoulos | F21V 14/02 |
| 9,632,509 | B1* | 4/2017 | Aphek | B64C 39/024 |
| 2006/0181405 | A1* | 8/2006 | Hansen | G01S 7/003 |
| | | | | 340/506 |
| 2010/0042269 | A1* | 2/2010 | Kokkeby | G01S 3/7864 |
| | | | | 701/3 |
| 2012/0271491 | A1* | 10/2012 | Spata | G01C 23/00 |
| | | | | 701/3 |
| 2014/0010050 | A1* | 1/2014 | DeAngelo | G08B 13/1618 |
| | | | | 367/112 |
| 2014/0277854 | A1* | 9/2014 | Jones | H04B 7/18504 |
| | | | | 701/3 |
| 2015/0035437 | A1* | 2/2015 | Panopoulos | F21V 14/02 |
| | | | | 315/112 |
| 2015/0148988 | A1* | 5/2015 | Fleck | G08B 25/016 |
| | | | | 701/2 |
| 2015/0225081 | A1* | 8/2015 | Stabler | B64C 39/024 |
| | | | | 701/3 |
| 2015/0302669 | A1* | 10/2015 | Gonnsen | G01M 5/0075 |
| | | | | 701/23 |
| 2015/0339912 | A1* | 11/2015 | Farrand | G08B 25/001 |
| | | | | 340/501 |
| 2015/0379874 | A1* | 12/2015 | Ubhi | G01S 5/0027 |
| | | | | 701/3 |
| 2016/0033966 | A1* | 2/2016 | Farris | A47G 29/122 |
| | | | | 701/15 |
| 2016/0050840 | A1* | 2/2016 | Sauder | G05D 1/0094 |
| | | | | 701/3 |
| 2016/0070265 | A1* | 3/2016 | Liu | G01C 21/00 |
| | | | | 701/3 |
| 2016/0247404 | A1* | 8/2016 | Srivastava | G01C 21/20 |
| 2016/0266577 | A1* | 9/2016 | Kerzner | G05D 1/0022 |
| 2016/0266579 | A1* | 9/2016 | Chen | B64C 39/024 |
| 2016/0284221 | A1* | 9/2016 | Hinkle | G08G 5/006 |
| 2016/0292872 | A1* | 10/2016 | Hammond | G01S 17/66 |
| 2016/0321503 | A1* | 11/2016 | Zhou | G05D 1/0061 |
| 2016/0376004 | A1* | 12/2016 | Claridge | A63H 27/12 |
| | | | | 701/3 |
| 2017/0003142 | A1* | 1/2017 | Allcorn | G01F 15/063 |
| 2017/0092109 | A1* | 3/2017 | Trundle | B64D 47/04 |
| 2017/0092138 | A1* | 3/2017 | Trundle | B64C 39/024 |
| 2017/0146344 | A1* | 5/2017 | Clark | B64C 39/024 |
| 2017/0166067 | A1* | 6/2017 | Panopoulos | F21V 14/02 |
| 2017/0178222 | A1* | 6/2017 | High | G01N 33/24 |
| 2017/0185849 | A1* | 6/2017 | High | B64C 39/024 |
| 2017/0187993 | A1* | 6/2017 | March | B64C 39/024 |
| 2017/0280678 | A1* | 10/2017 | Jones | A01K 5/0291 |
| 2017/0302363 | A1* | 10/2017 | Fan | H04W 24/02 |
| 2017/0313421 | A1* | 11/2017 | Gil | B64D 1/00 |
| 2017/0320572 | A1* | 11/2017 | High | B64C 39/024 |
| 2017/0330466 | A1* | 11/2017 | Demetriades | G08G 5/0034 |
| 2017/0372259 | A1* | 12/2017 | Lesser | B64D 1/08 |
| 2018/0009549 | A1* | 1/2018 | Sullivan | B64F 1/22 |
| 2018/0011484 | A1* | 1/2018 | Wang | G05D 1/0022 |
| 2018/0068187 | A1* | 3/2018 | Schultz | G06K 9/00637 |
| 2018/0072417 | A1* | 3/2018 | Shannon | B64C 39/024 |
| 2018/0111683 | A1* | 4/2018 | Di Benedetto | G08G 5/0013 |
| 2018/0155023 | A1* | 6/2018 | Choi | G05D 1/0202 |
| 2018/0158197 | A1* | 6/2018 | Dasgupta | G05D 1/0094 |
| 2018/0174102 | A1* | 6/2018 | Winkle | B64D 11/0624 |
| 2018/0204470 | A1* | 7/2018 | Rezvani | B64C 39/024 |
| 2018/0246507 | A1* | 8/2018 | Bachrach | G05D 1/0016 |
| 2018/0322749 | A1* | 11/2018 | Kempel | G08B 13/19608 |
| 2019/0025822 | A1* | 1/2019 | Sentosa | G05D 1/0038 |
| 2019/0047695 | A1* | 2/2019 | Boudville | H04W 4/023 |
| 2019/0069535 | A1* | 3/2019 | Hauck, Jr. | G05D 1/02 |
| 2019/0156640 | A1* | 5/2019 | Cutcher | G08B 13/19613 |
| 2019/0246626 | A1* | 8/2019 | Baughman | A01K 29/005 |

* cited by examiner

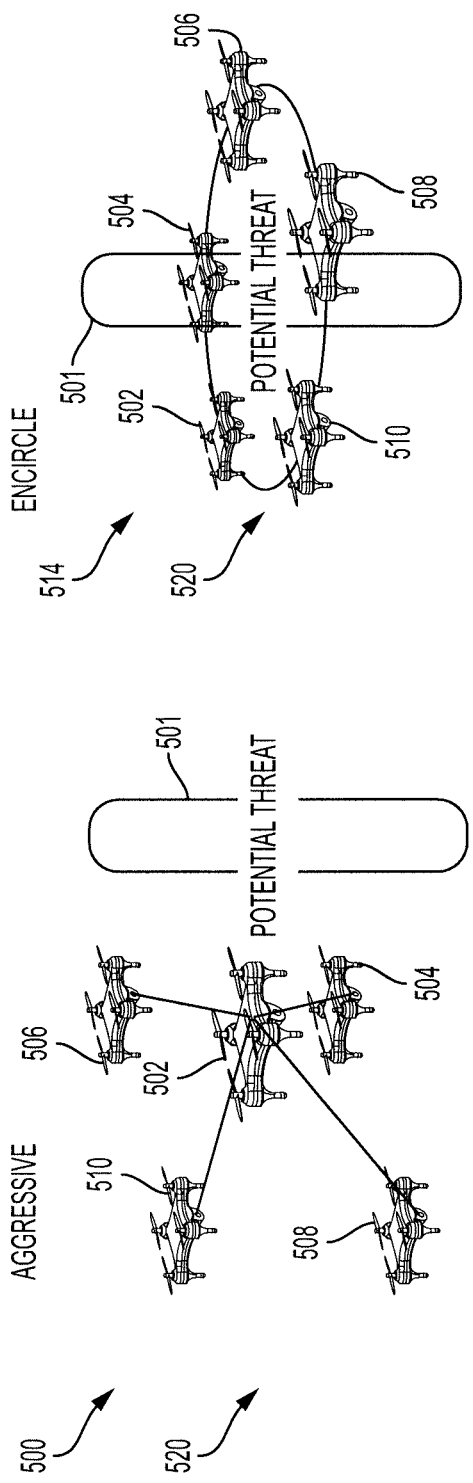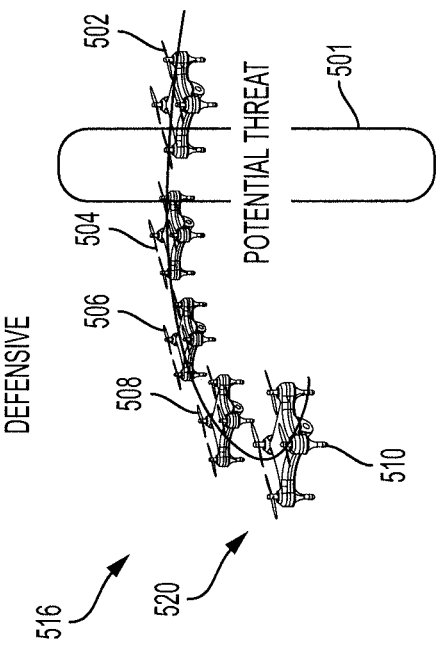
FIG. 5A
FIG. 5B
FIG. 5C

SECURITY DRONE SYSTEM

BACKGROUND

Field

The present invention relates to a security drone that can move within a predetermined area, detect data within the predetermined area, identify potential hazards based on the detected data, and transmit alerts when a potential hazard is identified.

Description of the Related Art

Security systems have been in use for some time. Such systems may aid in safeguarding the lives of people and their property. Original security systems included an alarm and a sensor such as a motion sensor or a sensor capable of detecting when a door or a window has been opened. In response to the signal detecting an event, the alarm of the security system would sound. The hope was that the alarm would scare off an intruder or at least alert neighbors so that they could call the authorities.

Security system technology has advanced along with most other technologies. For example, security systems can now transmit an alert to authorities if a particular sensor is triggered. Furthermore, more and more security systems are now using cameras. The cameras are located in a specific location and may stream image data as it is detected. However, such cameras are fixed in their location and thus may be unable to detect image data corresponding to an entire area.

SUMMARY

Described herein is a security drone for monitoring a predetermined area. The security drone includes a drone housing defining a cavity. The security drone further includes an actuator coupled to the drone housing and designed to move the drone housing through the predetermined area. The security drone further includes a camera coupled to the drone housing and designed to detect image data corresponding to the predetermined area as the drone housing moves through the predetermined area. The security drone further includes a network access device positioned within the cavity and designed to transmit and receive data via a network. The security drone further includes a drone processor positioned within the cavity and coupled to the actuator, the camera, and the network access device. The drone processor is designed to control the actuator to move the drone housing through the predetermined area. The drone processor is further designed to identify a potential threat in the predetermined area based on the image data as the drone housing is moved through the predetermined area. The drone processor is further designed to transmit potential threat data corresponding to the potential threat to a remote device when the potential threat is identified.

Also described is a security drone for monitoring a predetermined area. The security drone includes a drone housing defining a cavity. The security drone further includes an actuator coupled to the drone housing and designed to move the drone housing through the predetermined area. The security drone further includes a camera coupled to the drone housing and designed to detect image data corresponding to the predetermined area as the drone housing moves through the predetermined area. The security drone further includes a network access device positioned within the cavity and designed to transmit and receive data via a network. The security drone further includes a memory designed to store route data corresponding to a predetermined route through the predetermined area. The security drone further includes a drone processor positioned within the cavity and coupled to the actuator, the camera, and the network access device. The drone processor is designed to control the actuator to move the drone housing along the predetermined route. The drone processor is further designed to identify a potential threat in the predetermined area based on the image data as the drone housing is moved through the predetermined area. The drone processor is further designed to transmit potential threat data corresponding to the potential threat to a remote device when the potential threat is identified.

Also described is a security system for monitoring a predetermined area. The security system includes at least one motion sensor positioned in the predetermined area and designed to detect motion data corresponding to detected motion at a specific location within the predetermined area. The security system further includes a security drone. The security drone includes a drone housing defining a cavity. The security drone further includes an actuator coupled to the drone housing and designed to move the drone housing through the predetermined area. The security drone further includes a camera coupled to the drone housing and designed to detect image data corresponding to the predetermined area as the drone housing moves through the predetermined area. The security drone further includes a network access device designed to transmit and receive data via a network. The security drone further includes a drone processor positioned within the cavity and coupled to the actuator, the camera, and the network access device. The drone processor is designed to control the actuator to move the drone housing to the specific location. The drone processor is further designed to identify a potential threat in the specific location based on the image data. The drone processor is further designed to transmit potential threat data corresponding to the potential threat to a remote device when the potential threat is identified.

BRIEF DESCRIPTION OF THE DRAWINGS

The features and advantages of the present application will become more apparent from the detailed description set forth below when taken in conjunction with the drawings, wherein:

FIGS. 5A, 5B, and 5C are drawings illustrating an exemplary operation of a security drone based on a selected swarm option according to an embodiment of the present disclosure;

DETAILED DESCRIPTION

A security drone or security system according to the present disclosure may be used, for example, for security monitoring of an indoor or outdoor location. For example, the security drone or security system may be utilized in a factory to monitor the production of goods, may be installed in a home to monitor the security of the home, or the like. The security drone may travel through a predetermined area, detecting data as it goes. The drone may be capable of detecting movement or otherwise detecting a potential threat. The security system may include one or more motion detectors positioned within the predetermined area that may detect motion. When motion is detected, the drone may fly to the area in which the motion was detected and may detect image data corresponding to the area. The drone may analyze the image data and determine whether a potential threat exists. The drone may then transmit an alert to a remote device that is associated with the user to alert the user of the potential threat.

The security systems disclosed herein may provide several advantages and benefits over conventional security systems. For example, the security drone includes a camera capable of detecting image data, allowing image data to be detected for the entire predetermined area. This is beneficial because a potential threat is unlikely to be able to hide from view of the camera. The security drone may be advantageously programmed to respond to a potential threat in multiple manners. For example, the security drone may beneficially alert a user when a potential threat is detected. The security drone may further contact authorities if the potential threat is determined to be relatively severe. Based on user input and/or predetermined settings, the security drone may advantageously respond to a potential threat by remaining a predetermined distance away from the threat (protecting the security drone from damage) or by maneuvering relatively close to the potential threat in order to collect higher-quality data. The security drone may beneficially collect more data regarding a specific area if motion has been detected in the specific area.

Figure 1:
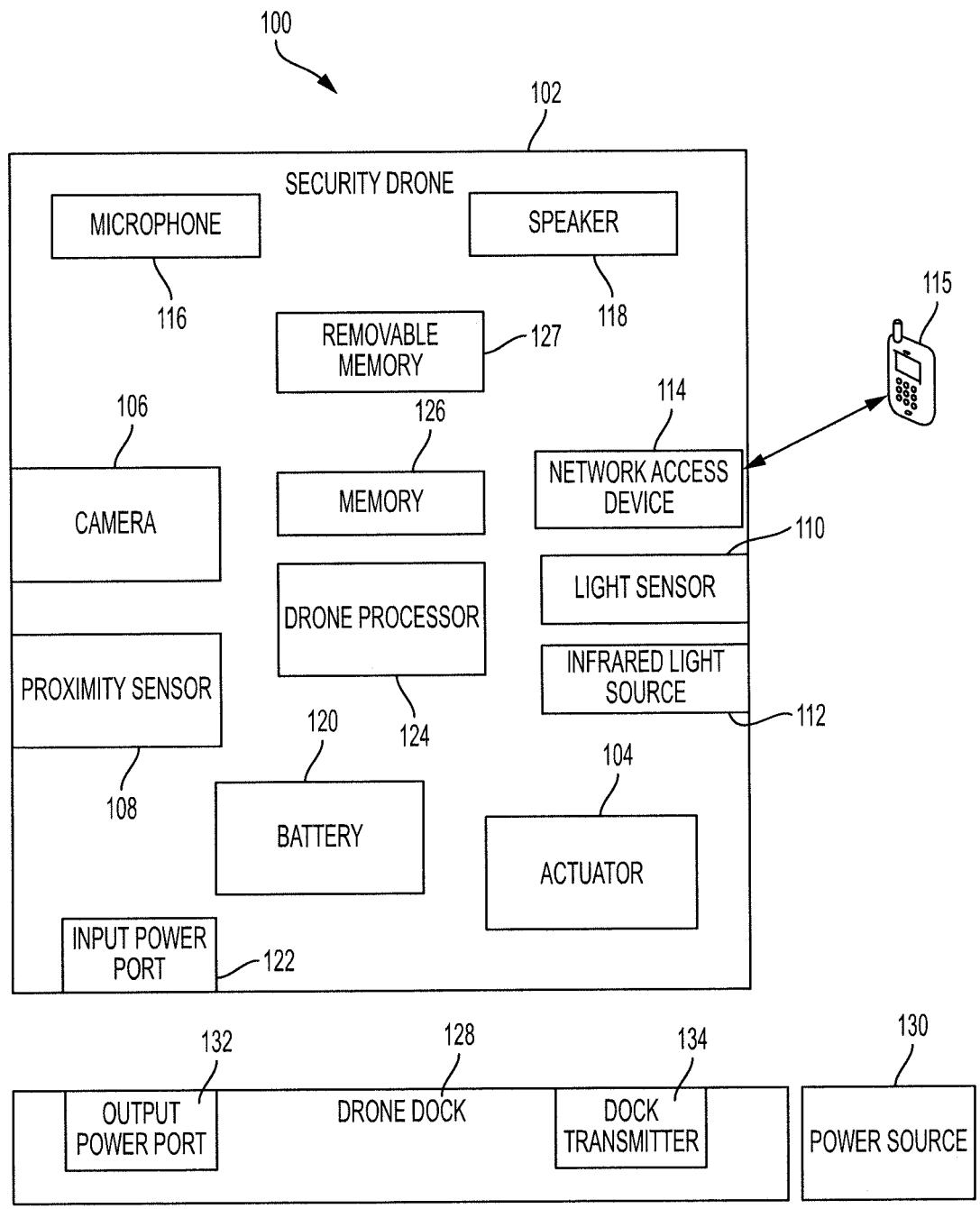
FIG. 1 is a block diagram illustrating various components of a security drone according to an embodiment of the present disclosure.

Turning now to FIG. 1, a security drone 100 may include a drone housing 102. The security drone 100 may also include an actuator 104 that is capable of moving the drone housing 102 within a predetermined area. The security drone 100 may be a ground-based security drone, in which the actuator 104 may include wheels, and/or may be an air-based security drone, in which the actuator 104 may include airfoils for lifting the security drone 100 above a ground surface.

The security drone 100 may further include a plurality of sensors including a camera 106, a proximity sensor 108, and a light sensor 110. The camera 106 may be capable of detecting image data (which may include still image data or video data) corresponding to an environment of the security drone 100.

The proximity sensor 108 may include any sensor capable of detecting the presence of objects within a predetermined distance of the security drone 100. For example, the proximity sensor 108 may include a radar detector, a LIDAR (light imaging and ranging) detector, or the like. The detected object data within the predetermined distance may be received by a drone processor 124 and used to control the actuator 104 to prevent the drone housing 102 from contacting an object.

The light sensor 110 may be capable of detecting an ambient amount of light in the environment of the security drone 100. The security drone 100 may further include an infrared light source 112 that may provide night vision capabilities. In some embodiments, if the light sensor 110 detects that the ambient amount of light is below a predetermined threshold amount of light then the drone processor 124 may control the infrared light source 112 to output infrared light. The predetermined threshold amount of light corresponds to an amount of light in which the camera 106 may be incapable of detecting sufficient detail regarding the environment. When the infrared light source 112 outputs the infrared light, the camera 106 may be capable of detecting images corresponding to the infrared-illuminated environment.

The security drone 100 may further include a network access device 114. The network access device 114 may be capable of communicating with a remote device 115, either directly or via a cloud. The network access device 114 may include one or more communication devices capable of communicating via one or more communication protocols. For example, the network access device 114 may include a first device capable of communicating via an IEEE 802.11 standard protocol (Wi-Fi), a second device capable of communicating via a cellular protocol (such as 3G, 4G, or 5G), a third device capable of communicating via an IEEE 802.15.1 standard protocol (Bluetooth), or the like.

The remote device 115 may include an app or other control logic for controlling the security drone 100. The remote device 115 may further receive data from the drone 100 corresponding to potential threats. For example, if a potential threat is detected by the camera 106, the drone processor 124 may transmit image data corresponding to the potential threat to the remote device 115. Additionally, the remote device 115 may provide control instructions to the drone processor 124, such as requests for the security drone 100 to perform specific actions or requests to change settings of the security drone 100.

The security drone 100 may further include a microphone 116 and a speaker 118. The microphone 116 may be capable of detecting speech or other audio data in the environment of the security drone 100. The speaker 118 may be capable of outputting audio data. In some embodiments, audio data detected by the microphone 116 may be transmitted to, and output by, the remote device 115 via the network access device 114. Furthermore, the speaker 118 may receive audio data received from the remote device 115 via the network access device 114 and may output the audio data. In that regard, the security drone 100 may be capable of two-way audio communication with the remote device 115.

The security drone 100 may include a battery 120. The battery 120 may include any battery or other power storage device capable of storing electrical energy. The components of the security drone 100 may operate using the energy stored in the battery 120. The battery 120 may be rechargeable. The security drone 100 may further include an input power port 122. The input power port 122 may receive electrical energy from a remote source and may transfer the electrical energy to the battery 120 for storage.

The security drone 100 may further include a drone dock 128. The drone dock 128 may be physically separate from the drone housing 102 (i.e., the drone dock 128 and the security drone 100 may be uncoupled). The drone dock 128 may be coupled to a power source 130 and may receive electrical energy from the power source 130. The drone dock 128 may further include an output power port 132. The output power port 132 may output the electrical energy from the power source 130 in such a way that the electrical energy may be received by the input power port 122. The output power port 132 may be a wired port or a wireless port. In that regard, electrical energy may transfer from the output power port 132 to the input power port 122 via a direct connection or a wireless connection.

The drone dock 128 may further include a dock transmitter 134. The dock transmitter 134 may transmit a beacon that is usable to determine the location of the drone dock 128. The network access device 114 or another component may receive the beacon from the dock transmitter 134. The drone processor 124 may use the beacon to determine the relative location of the drone dock 128 and may control the actuator 104 to move the drone housing 102 to the drone dock 128. For example, if a current battery status corresponding to a charge level of the battery 120 reaches or drops below a predetermined charge level then the drone processor 124 may control the actuator 104 to move the drone housing 102 to the drone dock 128 such that the battery 120 can receive power via the output power port 132. The predetermined charge level may correspond to a battery charge level at which the battery 120 may be void of electrical energy after a predetermined period of usage.

The security drone 100 may further include the drone processor 124, a memory 126, and a removable memory 127. The memory 126 may store instructions usable by the drone processor 124 to control the security drone 100. The memory 126 may also store additional data such as detected images, maps corresponding to a predetermined area through which the security drone 100 will travel, or the like.

The removable memory 127 may be capable of receiving a removable memory device, such as a mini or microSD card or USB stick, and storing data on the removable memory device. The drone processor 124 may store image data detected by the camera 106 on the removable memory device such that a user may later view the stored image data.

The drone processor 124 may include a processor or controller specifically designed for operation with a drone. For example, the drone processor 124 may be capable of controlling movement of the drone housing 102 by transmitting instructions to the actuator 104. The drone processor 124 may be electrically coupled to some or all of the components of the security drone 100. In that regard, the drone processor 124 may control operation of the components of the security drone 100 based on at least one of instructions stored in the memory 126 or instructions received from the remote device 115.

Figure 2:
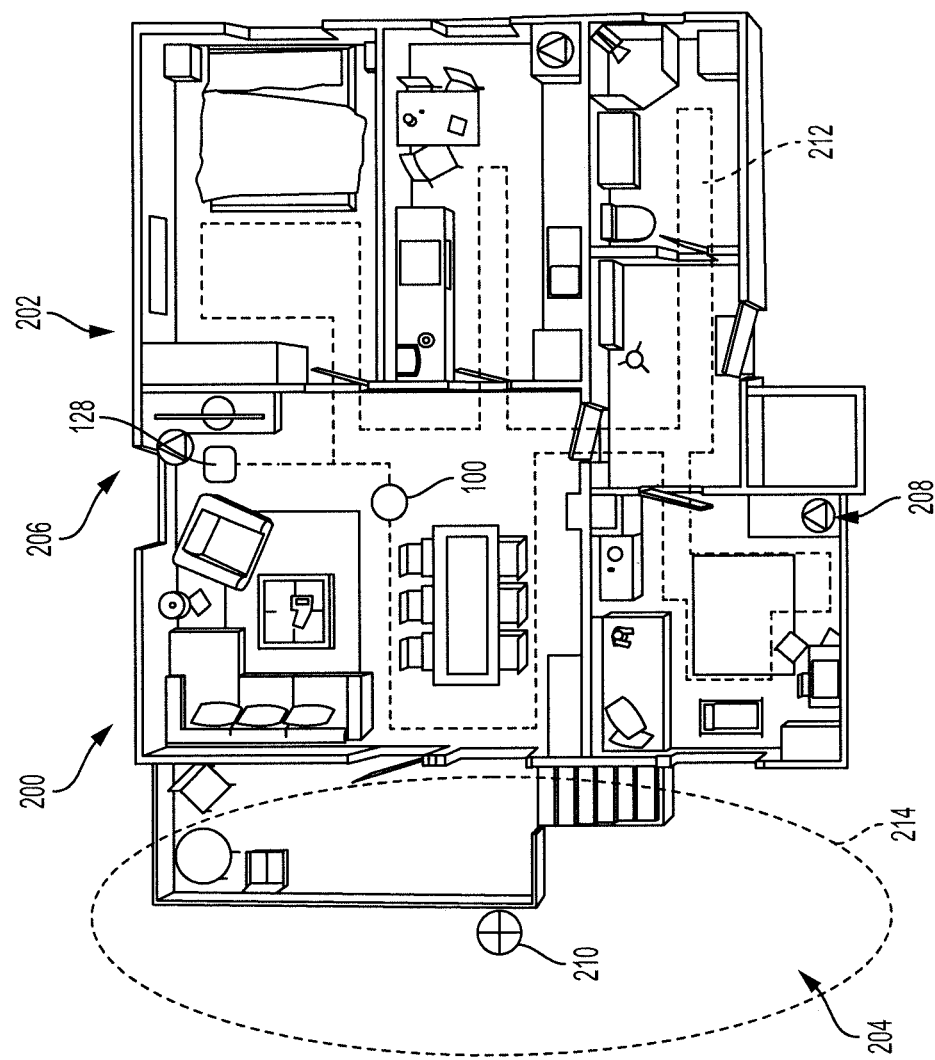
FIG. 2 is a drawing illustrating components of a security system that includes the security drone of FIG. 1 according to an embodiment of the present disclosure.

Referring now to. FIG. 2, a security system 200 may include the security drone 100, one or more motion sensors 208, and one or more location transmitters 210. The security system 200 may be positioned in a predetermined area 206 which may include at least one of an area inside of a structure 202 or an outdoor area 204. The motion sensors 208 may be located throughout the predetermined area 206 and may be designed to detect motion within the predetermined area 206.

The security drone 100 may be designed to periodically travel through the predetermined area 206 or to travel through the predetermined area 206 in response to a trigger. In some embodiments, the security drone 100 may be programmed to travel along a predetermined route 212 periodically or at predetermined patrol times. For example, the security drone 100 may be programmed to travel along the predetermined route 212 at 8 AM, 12 PM, 4 PM, and 8 PM.

The predetermined route 212 may be provided to the security drone 100 in a variety of manners. For example, image data or map data corresponding to the predetermined area may be provided to the security drone 100 and stored in the memory. A user may draw the predetermined route 212 on the map or may upload image data corresponding to the predetermined area 206 and the predetermined route 212 using a remote device. As another example, a user may walk or otherwise transport the security drone 100 along the predetermined route 212 to teach the predetermined route 212 to the security drone 100. As another example, the predetermined route 212 may be determined by the security drone 100, such as by following the walls of the structure 202. As yet another example, virtual walls may be positioned within the predetermined area 206 that define the bounds of the predetermined area 206 and the security drone 100 may travel anywhere within the bounds of the virtual walls.

As the security drone 100 travels along the predetermined route 212, the security drone may continuously or periodically detect image data corresponding to the predetermined area 206. The security drone 100 may analyze the image data to determine if a potential threat exists. For example, the security drone 100 may determine that a potential threat exists if the security drone 100 detects movement within the predetermined area, if the security drone 100 detects an object that was not present during a previous trip to the area, if the detected image data matches stored image data that corresponds to a potential threat (i.e., the detected image data indicates that a gun is present), or the like.

In some situations, the security drone 100 may be unable to traverse the entire predetermined route 212. For example, if a door within the structure 202 is closed, the security drone may be unable to reach a portion of the predetermined route 212 that is behind the closed door. In that regard, the security drone 100 may take one or more actions from a list of actions. For example, the security drone 100 may avoid the inaccessible portion of the predetermined route 212 and continue patrolling the remainder of the predetermined route 212 as normal. As another example, the security drone 100 may consider the closed door to indicate a potential threat. As another example, the security drone 100 may transmit data to a remote device associated with a user indicating that a portion of the predetermined route 212 is inaccessible and request further instruction from the remote device. As yet another example, the security drone 100 may attempt to access the inaccessible portion via another path.

The motion sensors 208 may be capable of communicating with the security drone 100. In that regard, each of the motion sensors 208 may transmit motion data to the security drone 100, corresponding to movement at a specific location, when the motion sensor 208 detects motion. The security drone 100 may travel to the specific location and detect image data corresponding to the specific location when the motion data is received. The security drone 100 may analyze the detected image data to determine if a potential threat exists.

The location transmitter 210 may transmit a beacon. The security drone 100 may utilize the beacon to determine an area in which to travel. For example, the security drone 100 may be designed to stay within a predetermined distance of the location transmitter 210. The predetermined distance may indicate a perimeter 214 within which the security drone 100 should remain. In that regard, the security drone 100 may travel along the perimeter 214, may travel in a pattern within the perimeter 214, may travel randomly within the perimeter 214, or the like.

If the security drone 100 determines that a potential threat exists, the security drone 100 may transmit potential threat data to a remote device indicating the presence of the potential threat. In some embodiments, the potential threat data may include image data corresponding to the potential threat, may include a text message or other alert indicating that a potential threat is present, or the like. In some embodiments, the remote device may include a device associated with the user. In some embodiments, the remote device may be a device associated with authorities.

In some embodiments, the security drone 100 may be capable of determining what action to take in response to a potential threat based on the detected data. For example, if the detected image data indicates that a person has fallen down and is not moving then the security drone 100 may contact a device associated with authorities. Similarly, if the detected image data indicates the presence of a gun, the security drone 100 may again contact a device associated with authorities. However, if the detected image data indicates movement and nothing else then the security drone 100 may transmit image data corresponding to the movement to a device associated with the user.

Figure 3A:
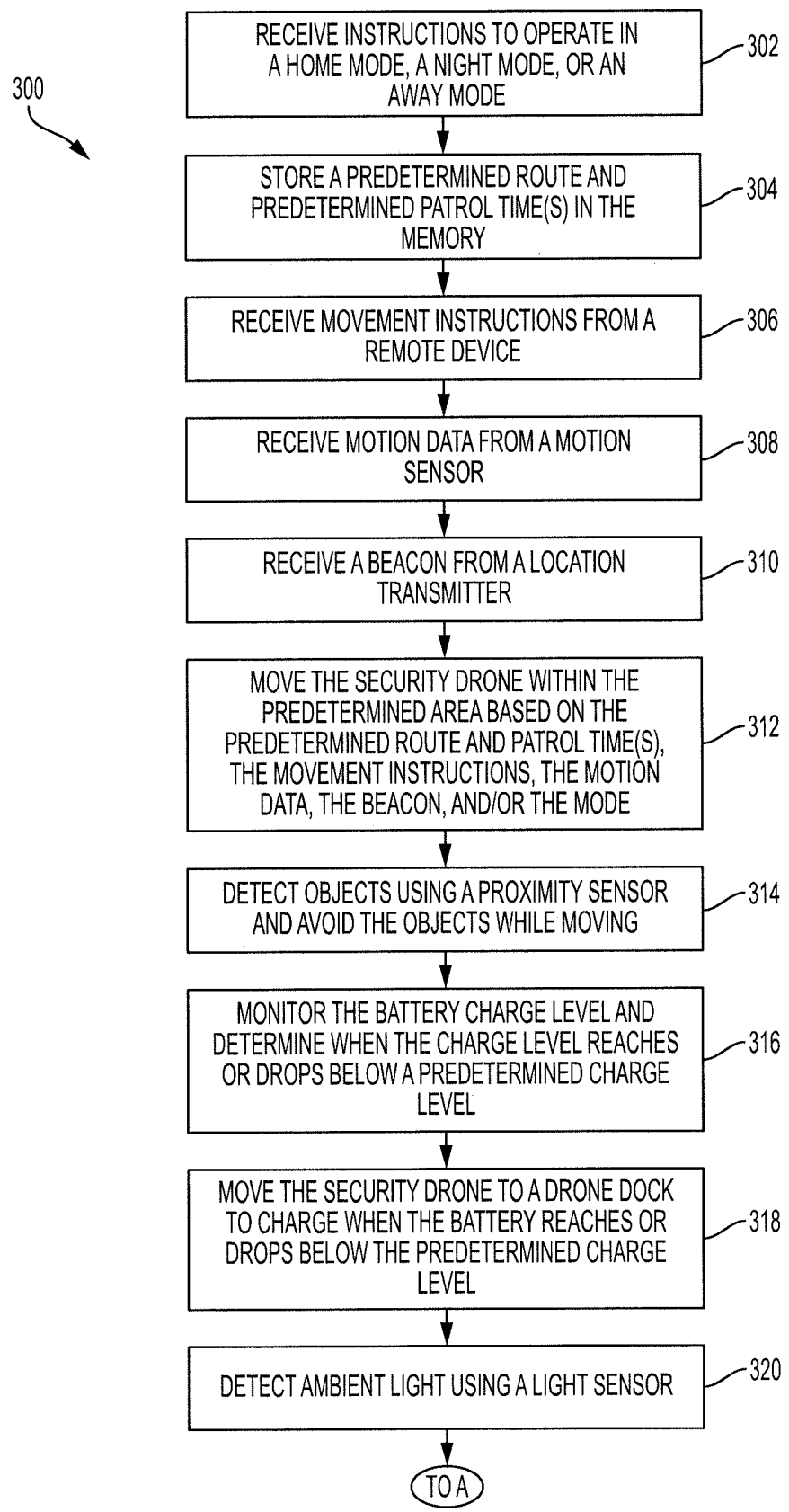
FIGS. 3A and 3B are flowcharts illustrating a method for monitoring a predetermined area using a security system that includes a security drone according to an embodiment of the present disclosure.
Figure 3B:
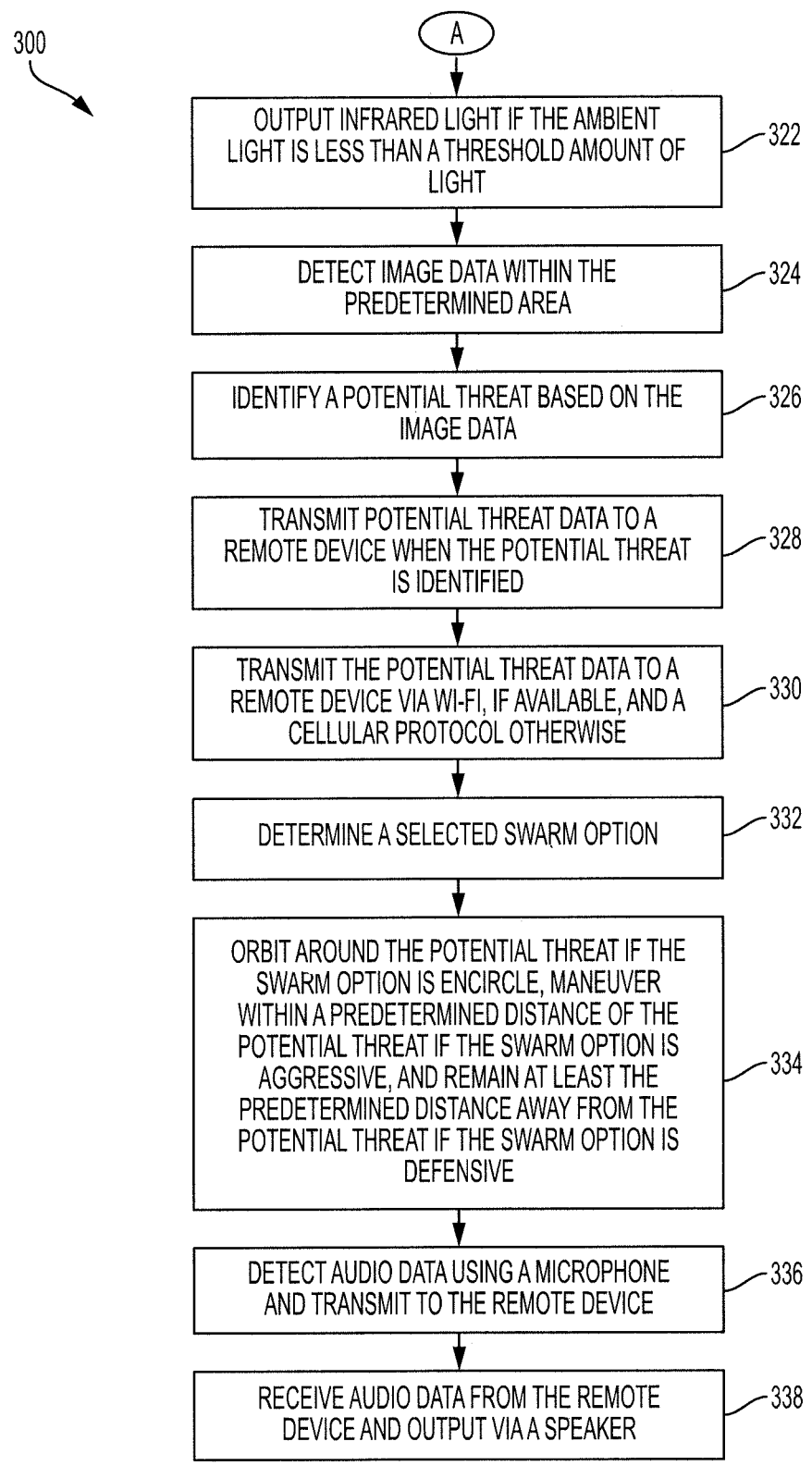

Referring now to FIGS. 3A and 3B, a method 300 be performed by components of a security drone or a security system, such as the security drone 100 of FIG. 1 or the security system 200 of FIG. 2. For example, at least some blocks of the method 300 may be performed by the drone processor 124 of FIG. 1.

In block 302, the security drone may receive instructions to operate in a specific mode. In some embodiments, the instructions may be received from a remote device, such as a user device. In some embodiments, the security drone may be programmed to operate in a specific mode based on a current time of day. For example, the user may request that the security drone operate in a night mode from 11 PM until 7 AM each day.

Figure 4:
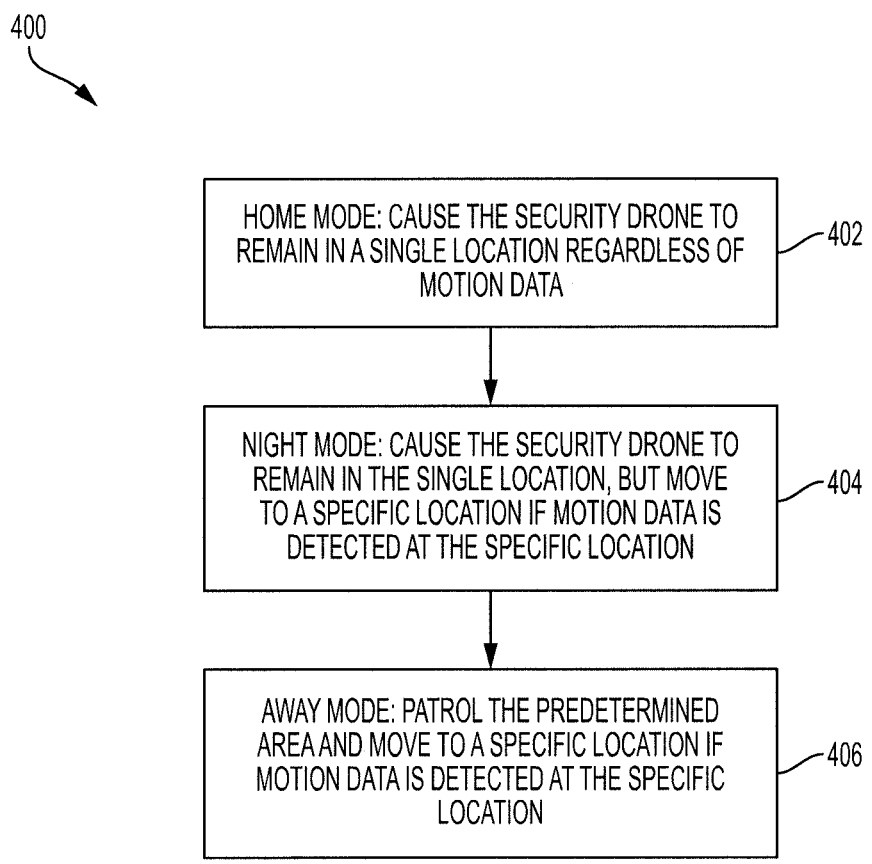
FIG. 4 is a flowchart illustrating a method for controlling a security drone based on a selected mode of operation according to an embodiment of the present disclosure.

Exemplary modes of operation include a home mode, a night mode, and an away mode. Referring to FIG. 4, a method 400 illustrates operation of the security drone based on the selected mode. In block 402, if the mode is the home mode, the drone processor may control the security drone to remain in a single location regardless of motion data. The single location may correspond to the drone dock such that the battery of the security drone may be fully charged upon expiration of the home mode. In some embodiments, the single location may correspond to any other location within the predetermined area. The home mode may be used, for example, when a user is home and monitoring of the predetermined area is non-beneficial.

In block 404, if the mode is the night mode, the drone processor may control the security drone to remain in a single location but to move to a specific location if motion data is detected at the specific location by a motion detector. For example, the security drone may remain at the drone dock unless motion is detected at another location. However, if motion is detected elsewhere, the security drone may travel to the specific location of the motion, may detect image data, and may analyze the image data to determine if a potential threat exists. The night mode may be used, for example, when a user is at the predetermined area but occupied, such as when the user is sleeping, watching TV, or the like.

In block 406, if the mode is the away mode, the drone processor may control the security drone to patrol the predetermined area as scheduled and to move to a specific location if motion is detected at the specific location. The away mode may be used, for example, when a user is away from the predetermined area.

Returning reference to FIGS. 3A and 3B, a memory of the security drone may store a predetermined route and one or more predetermined patrol time in block 304. In some embodiments, the security drone may be programmed in block 304 to learn the predetermined route and/or the predetermined patrol time in one or more manner as described above.

In block 306, the security drone may receive movement instructions from a remote device. The movement instructions may include any of a variety of instruction types. For example, the movement instructions may include specific turn by turn instructions provided by a user via the remote device (i.e., such as remote control functionality). As another example, the movement instructions may include a new route or a selection of specific areas for the security drone to monitor. As yet another example, the movement instructions may include an instruction to travel through the entire area for a predetermined period of time.

In block 308, the security drone may receive motion data from a motion sensor positioned within the predetermined area. The motion data may indicate that the motion sensor detected movement at a specific location within the predetermined area. The motion data may indicate to the security drone that the security drone should travel to the specific location and detect data regarding the specific location to determine whether a potential threat exists at the specific location.

In block 310 the security drone may receive a beacon from a location transmitter. The location transmitter may be located within the predetermined area. The beacon may indicate an area beyond which the security drone should not travel. In that regard, the beacon may define a perimeter within which the security drone should remain while moving.

In block 312, the drone processor may move the security drone within the predetermined area based on the predetermined routes and patrol times, the movement instructions received from the remote device, the motion data received from the motion detector, the beacon received from the location transmitter, and/or the selected mode. For example, if the mode is the home mode then the security drone may stay located at the drone dock regardless of external circumstances. If the mode is the night mode then the security drone may only leave the drone dock if motion is detected elsewhere by a motion detector. If the mode is the away mode then the security drone may travel along the predetermined route at the predetermined times, may travel within the perimeter defined by the beacon transmitted from the location transmitter, and may travel to a specific location if motion is detected at the specific location. In some embodiments, the security drone may travel according to movement instructions when the movement instructions are received from the remote device regardless of the selected mode.

In block 314, the security drone may detect objects as it moves throughout the predetermined area using one or more proximity sensor. The drone processor may analyze the detected object data to determine the location of the object or objects relative to the security drone. The drone processor may further control the actuator to move the security drone through the predetermined area in such a manner as to avoid contact with the object or objects based on the detected object data.

In block 316 the drone processor may continuously or periodically monitor the battery charge level of the battery of the security drone. The drone processor may further compare the battery charge level to a predetermined charge level to determine when the battery charge level reaches or drops below the predetermined charge level.

In block 318 the drone processor may move the security drone to a drone dock to charge the battery when the charge level of the battery reaches or drops below the predetermined charge level. The drone processor may control the actuator to orient the drone housing in such a way that the input power port of the drone may receive power from the output power port of the drone dock. For example, if the output power port requires contact to transfer power then the drone processor may control the actuator to orient the drone housing relative to the drone dock such that the input power port can contact the output power port. If the output power port may provide electrical energy wirelessly then the drone processor may control the actuator to orient the drone housing such that the input power port is sufficiently close to the output power port that the input power port may wirelessly receive the electrical energy from the output power port.

In block 320 a light sensor of the security drone may detect an ambient amount of light in the environment of the security drone. In block 322 the drone processor may determine whether the ambient amount of light is less than a threshold amount of light. If the ambient amount of light is less than the threshold amount of light then the drone processor may control an infrared light source of the security drone to output infrared light.

In block 324 the camera may detect image data within the predetermined area. For example, if the security drone is traveling along a predetermined route then the security drone may detect image data as it travels. As another example, if the security drone is traveling to a specific location where motion was detected then the camera may detect image data corresponding to the specific location.

In block 326 the drone processor may analyze the detected image data to determine if a potential threat exists. For example, the drone processor may analyze the image data to determine if motion is detected within the predetermined area. The drone processor may associate motion with a potential threat. As another example, the drone processor may compare the detected image data to image data stored in the memory that corresponds to potential threats. If the detected image data matches stored image data then the drone processor may determine that a potential threat exists. As yet another example, the drone processor may compare the detected image data to previously detected image data to determine if one or more objects have moved within the predetermined area. If one or more objects have moved then the drone processor may determine that a potential threat exists.

In block 328 the drone processor may transmit potential threat data to a remote device when a potential threat is identified. In some embodiments the drone processor may be designed to take the same action each time a potential threat is identified. For example, the drone processor may be designed to send at least one of an alert or image data corresponding to the potential threat to a remote device associated with the user.

In some embodiments the drone processor may be designed to take separate actions based on the potential threat and/or other factors such as the mode of operation. For example, potential threats may be organized into multiple categories such that each category corresponds to a different threat level. In that regard, potential threats that represent a serious threat (such as the image data indicating presence of a gun or indicating that a person has fallen) may be placed and a first category and potential threats that are unlikely to represent a serious threat (such as image data indicating that an object has moved within the predetermined area) may be placed in a second category. If a detected potential threat corresponds to a serious threat then the drone processor may transmit an alert or image data corresponding to the threat to authorities and to a user device. If a detected potential threat is unlikely to represent a serious threat then the drone processor may transmit an alert or image data corresponding to the threat to a user device.

Similarly, the drone processor may be designed to transmit potential threat data immediately to authorities if the selected mode is the home mode or the night mode. This is because the user may be in danger and unable to contact authorities himself In block 330 the drone processor may determine how to transmit the potential threat data to the remote device. Because the network access device may be capable of transmitting and receiving messages via more than one protocol, the drone processor may determine which protocol to use based on one or more factors. In some embodiments, each protocol may be given a rank such that higher ranking protocols are attempted first. For example, Wi-Fi may be provided with the highest rank such that the drone processor transmits the potential threat data via Wi-Fi when available. The drone processor may determine to transmit the potential threat data via a cellular protocol if Wi-Fi is unavailable.

In block 332 the drone processor may determine a selected swarm option from multiple swarm options. In some embodiments, the drone processor may receive a selected swarm option via a user device. In some embodiments, the drone processor may be designed to always operate in a certain swarm option. In some embodiments, the user may select a setting to indicate a preferred swarm option. In some embodiments, the drone processor may select a swarm option based on the detected image data. For example, if the detected image data indicates that the potential threat is moving violently then the drone processor may select a defensive swarm option.

Referring to FIGS. 5A, 5B, and 5C, a drone processor may be designed to operate in an aggressive swarm option 500, an encircle swarm option 514, and a defensive swarm option 516. Each of the swarm options 500, 514, 516 may be performed by a single drone or by multiple security drones, as shown. In particular, the security system illustrated in FIGS. 5A, 5B, and 5C includes five security drones 520 including a first security drone 502, a second security drone 504, a third security drone 506, a fourth security drone 508, and a fifth security drone 510.

In the aggressive swarm option 500, one or more of the security drones 520 may be allowed to be positioned any distance from a potential threat 501. In embodiments including multiple security drones 520, one or more of the security drones 520 may be allowed to move within a predetermined distance of the potential threat 501 and one or more of the security drones 520 may remain at least the predetermined distance away from the potential threat 501. Using the aggressive swami option 500 allows the security drones 520 to potentially obtain relatively high quality image data corresponding to the potential threat 501.

In some embodiments, one or more of the security drones 520 may remain directly in front of the potential threat 501 when in the aggressive swarm option 500. For example, the cameras of the security drones 520 may detect the location of eyes of a potential threat (or a forward direction of the potential threat 501) and the drone processors may control the security drones 520 to remain in front of the eyes or the forward direction.

In the encircle swarm option 514, the security drones 520 may be designed to form a circle around the potential threat 501. In embodiments in which a single security drone is utilized, the single security drone may periodically or continuously circle around the potential threat 501. Using the encircle swarm option 514 allows the security drones 520 to attempt to keep the potential threat 501 in place and to potentially obtain image data corresponding to multiple views of the potential threat 501.

In the defensive swarm option 516, the security drones 520 may be designed to remain at least a predetermined distance away from the potential threat 501. The predetermined distance may correspond to a distance at which the potential threat 501 is unlikely to be capable of reaching or damaging the one or more of the security drones 520. For example, the predetermined distance may be 3 feet (0.9 meters), 5 feet (1.5 meters), or the like. Using the defensive swarm option 516 allows the security drones 520 to remain in a relatively safe position relative to the potential threat 501 such that damage to one or more security drone 520 is unlikely.

Returning reference to FIGS. 3A and 3B and in block 334, the drone processor may control the actuator to move the drone housing relative to the potential threat based on the selected swami option. For example, if the encircle swarm option is selected then the drone processor may cause the security drone to orbit around the potential threat. If the aggressive swarm option is selected then the drone processor may cause the security drone to maneuver in such a way that it may be positioned within any distance of the potential threat. If the defensive swarm option is selected then the drone processor may cause the security drone to maneuver in such a way that it will remain at least a predetermined distance away from the potential threat.

In block 336, the security drone may detect audio data using a microphone and may transmit the audio data to the remote device. In some embodiments, the audio data may be transmitted to the remote device along with the image data that corresponds to the potential threat. In some embodiments, the audio data may be provided to the remote device upon request from the remote device. In some embodiments, the drone processor may further analyze the detected audio data to determine whether a potential threat exists.

In block 338, the security drone may receive audio data from the remote device and may output the audio data via a speaker. For example, if a user of the remote device wishes to communicate with a potential threat (or anyone else inside of the predetermined area) then the user may transmit the audio data via the remote device. The security drone may receive the audio data and may output the audio data such that the potential threat or intended recipient can hear the audio data.

Figure 6A:
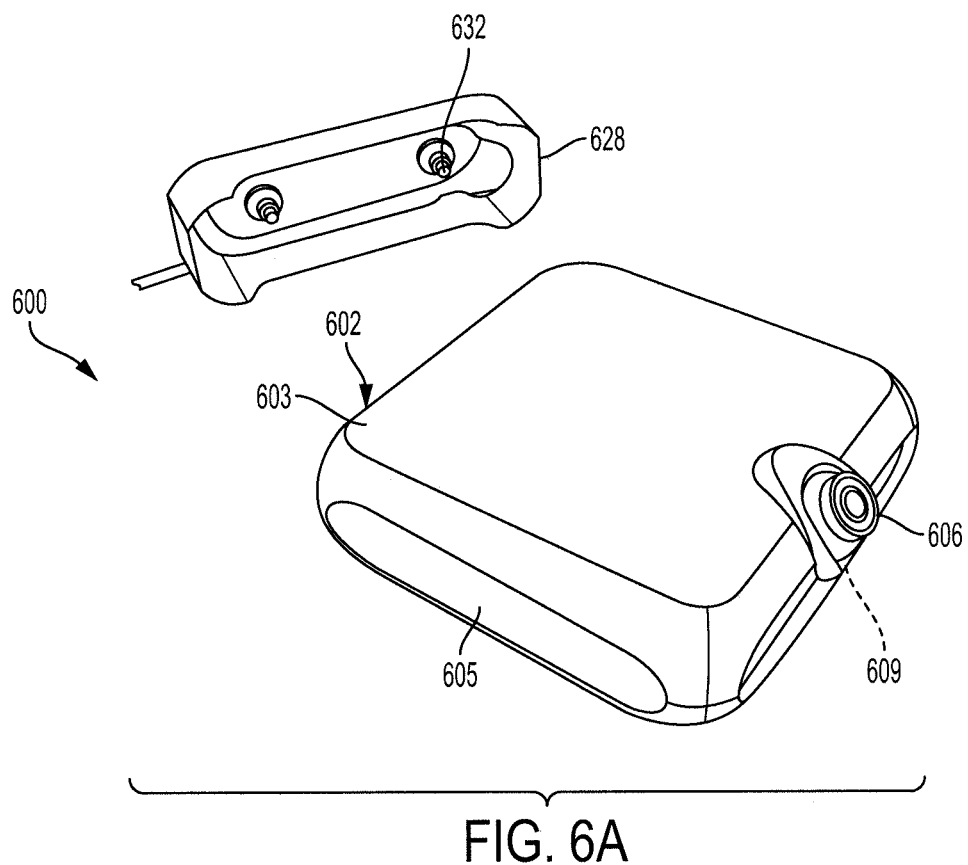
FIGS. 6A and 6B are drawings illustrating an exemplary design of a ground-based security drone according to an embodiment of the present disclosure.
Figure 6B:
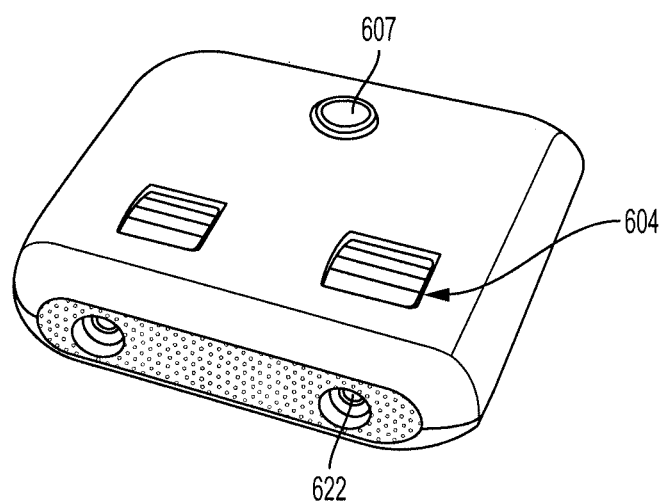

Referring now to FIGS. 6A and 6B, an exemplary security drone 600 is shown. The security drone 600 may be a ground-based security drone meaning that the security drone 600 maneuvers along a ground surface. In that regard, the security drone 600 includes one or more motor and wheels 604. The motor(s) may drive the wheels 604 causing the security drone 600 to maneuver along a ground surface. The security drone 600 may further include a rollerball 607. The wheels 604 may orient the security drone 600 in a desired direction and may propel the security drone 600. The rollerball 607 may allow the security drone 600 maneuver with relatively little friction with the ground surface. In some embodiments, the motor may include any type of motor that produces relatively little sound. In that regard, a potential intruder may be incapable of hearing the security drone 600 approach.

The security drone 600 may further include a drone housing 602 that includes a main housing 603 and one or more rubber bumpers 605. The main housing 603 may include a relatively stiff material that may protect internal components of the security drone 600. For example, the main housing 603 may include one or more of polycarbonate (PC) or Acrylonitrile-Butadiene-Styrene (ABS). In some embodiments, the main housing 603 may include a combination of PC and ABS.

The rubber bumpers 605 may include a rubber or other flexible material. In that regard, the rubber bumpers 605 may be positioned in such a location that contact with the drone housing 602 is likely to initially occur with the rubber bumpers 605 instead of the main housing 603. Accordingly, the rubber bumpers 605 may be capable of withstanding a greater impact without damage than the main housing 603.

The security drone 600 may further include a camera 606. The camera 606 may be coupled to a camera actuator 609 that may change the field of view of the camera 606 relative to the drone housing 602. In that regard, the drone processor of the security drone 600 may control the camera actuator 609 to scan a predetermined area or to focus on a specific location.

The security drone 600 may further include a drone dock 628. The drone dock 628 may include an output power port 632 that includes conductive contacts. The security drone 600 may further include an input power port 622 positioned on the drone housing 602 that also includes conductive contacts. In order to cause the security drone 600 to charge, the drone processor may position the drone housing 602 in such a way that the input power port 622 contacts the output power port 632.

Figure 7:
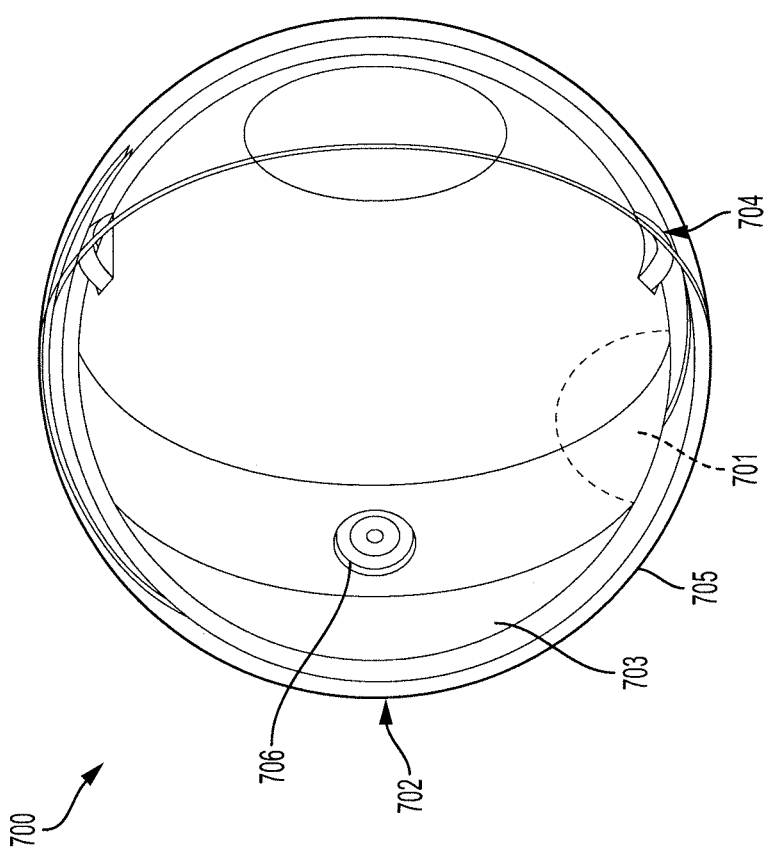
FIG. 7 is a drawing illustrating an exemplary design of a ground-based security drone according to an embodiment of the present disclosure.

Referring to FIG. 7, another security drone 700 may also be a ground-based security drone. In that regard, the security drone 700 includes a drone housing 702 that includes an inner housing 703 and an outer shell 705. A motor and wheels 704 may be coupled to the inner housing 703. The motor may cause the wheels 704 to rotate. The wheels 704 may contact the outer shell 705 and may cause the outer shell 705 to move along a ground surface, thus orienting and propelling the security drone 700 in a desired direction. A weight 701 may be located within the inner housing 703 and may cause the inner housing 703 to remain in a stationary orientation (i.e., a camera 706 remains facing in a desired direction as the drone housing 702 moves along the ground surface).

The inner housing 703 and the outer shell 705 may each include a relatively rigid material. For example, the inner housing 703 and the outer shell 705 may each include a combination of PC and ABS. In some embodiments, the outer shell 705 may have a greater ratio of PC to ABS than the inner housing 703.

Figure 8:
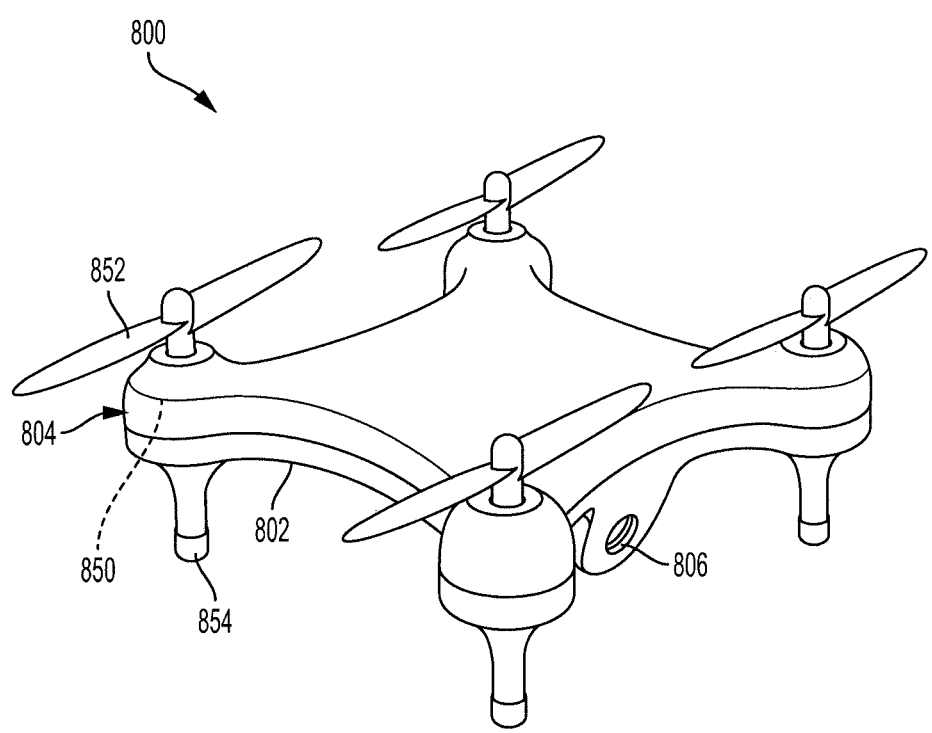
FIG. 8 is a drawing illustrating an exemplary design of an air-based security drone according to an embodiment of the present disclosure.

Referring to FIG. 8, another security drone 800 may be an air-based security drone and may include a drone housing 802. In that regard, the security drone 800 includes a plurality of actuators 804, each including a motor 850 and one or more airfoil 852. In that regard, the drone processor may control the one or more motor 850 independently to rotate the corresponding airfoil 852, thus causing the security drone housing 802 to elevate above a ground surface and to move in a desired direction.

The security drone 800 may further include a plurality of posts 854. As shown in FIG. 8, each of the posts 854 corresponds to one of the actuators 804. Each of the posts 854 may provide a structure for the security drone 800 to rest upon when positioned on a ground surface. In that regard, the posts 854 may prevent or reduce the likelihood of contact of a sensitive component of the security drone 800 with a ground surface.

The security drone 800 may further include a camera 806. Because the security drone 800 can fly, the drone processor may control the actuators 804 to orient the camera 806 in any desired direction.

Figure 9:
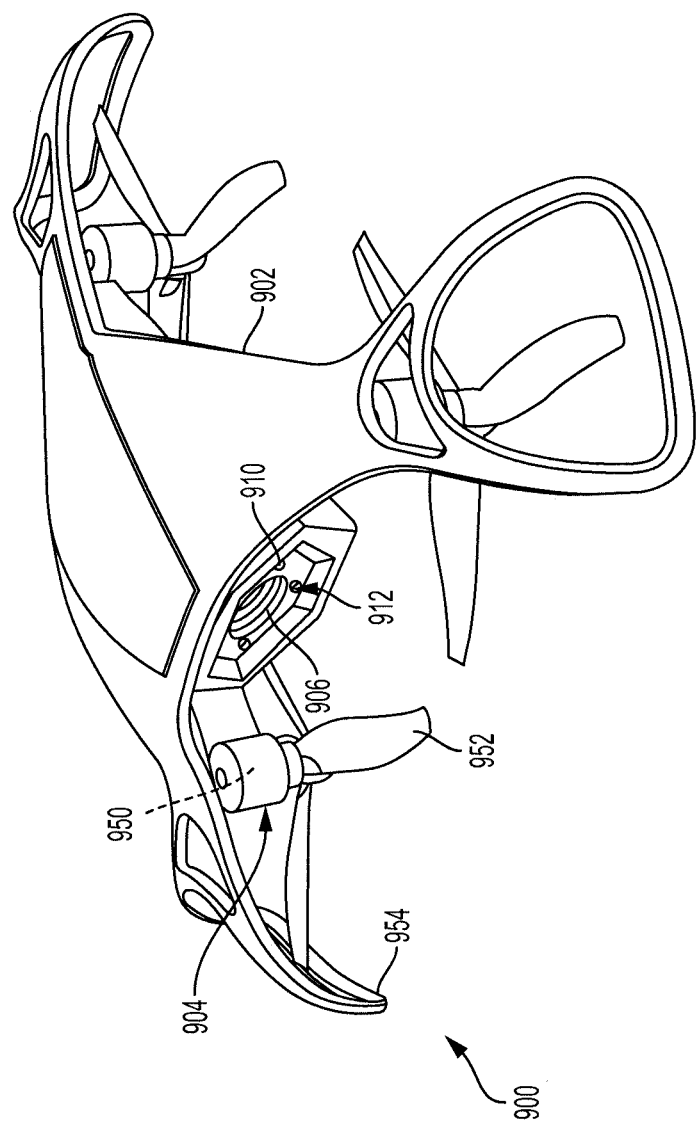
FIG. 9 is a drawing illustrating an exemplary design of an air-based security drone according to an embodiment of the present disclosure.

Referring now to FIG. 9, another security drone 900 may also be an air-based security drone and may include a drone housing 902. The drone housing 902 includes three support aims 954 that extend beyond airfoils 952 and provide a structure upon which the security drone 900 may rest when located on the ground surface. The support arms 954 may further protect the airfoils 952 from contact with objects, thus protecting the airfoils 952 from damage.

The security drone 900 may further include a plurality of actuators 904 that each includes a motor 950 and the airfoils 952. The motor 950 and airfoils 952 may function in a similar manner as the motor 850 and airfoils 852 of FIG. 8.

The security drone 900 may further include a camera 906, a light sensor 910, and an infrared light source 912. The camera 906 may be capable of detecting image data that is illuminated by light in the visible spectrum and in the infrared spectrum. In that regard, the light sensor 910 may detect an ambient amount of light in the environment. If the ambient amount of light is less than a predetermined light threshold then the drone processor may control the infrared light source 912 to output infrared light. In that regard, the camera 906 is capable of detecting image data even when the environment is relatively dark.

Figure 10:
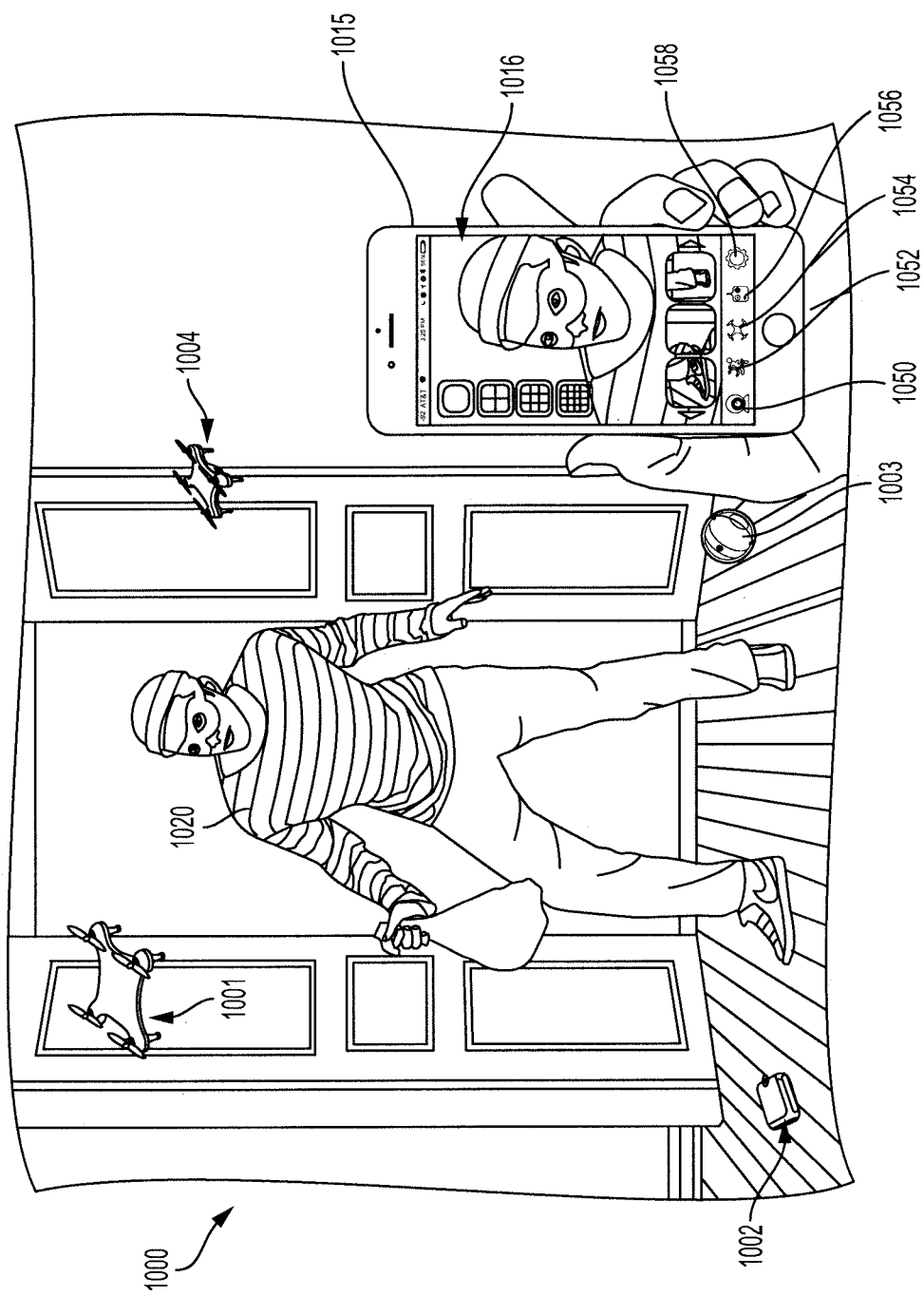
FIG. 10 is a drawing illustrating exemplary control of a security drone using an app on a remote device according to an embodiment of the present disclosure.

Referring now to FIG. 10, exemplary operation of a security system 1000 is illustrated. As shown in FIG. 10, the security system 1000 includes a first security drone 1001, a second security drone 1002, a third security drone 1003, and a fourth security drone 1004. A user may be communicating with the security drone 1001 via a remote device 1015 that is running an app 1016.

In FIG. 10, a motion detector may have detected motion corresponding to a potential threat 1020. The motion detector may have alerted each of the security drones 1001, 1002, 1003, 1004 of the motion, and the security drones 1001, 1002, 1003, 1004 may be encircling the potential threat 1020 (i.e., operating in the encircle swarm option). The security drone 1001 may have alerted the user via the remote device 1115. Accordingly, the user may interface with the security drone 1001 via the app 1016.

In particular, the app 1016 may include various features. For example, the app may include a camera feature 1050 that allows the user to view image data that is detected by the security drone 1001. As shown, the user is able to view the potential threat 1020 from a remote location via the camera feature 1050.

The app 1016 may further include a chasing feature 1052. When the chasing feature 1052 is selected, the security drone 1001 may follow the potential threat 1020 to stay updated regarding the location of the potential threat 1020.

The app 1016 may further include a fly feature 1054. The fly feature 1054 may cause the security drone 1001 to fly (i.e., to lift off from a resting state). In some embodiments, the fly feature 1054 may cause the security drone 1001 to lift off and travel along the predetermined route.

The app 1016 may further include a remote control feature 1056. The remote control feature 1056 may allow the user to control the flight or other movement path of the security drone 1001 remotely.

The app 1016 may further include settings 1058. The user may adjust the settings of the security drone 1001 using the settings 1058. For example, the user may set a predetermined route and predetermined flight times using the settings 1058. Furthermore, the user may select a desired swarm option and may select an operational mode (i.e., such as home, night, or away) of the security drone 1001 using the settings 1058. In some embodiments, the user may be able to identify or provide image data corresponds to potential threats using the settings 1058. For example, the user may take a picture of an unwanted person and may indicate via the settings 1058 that the unwanted person indicates a potential threat.

Figure 11:
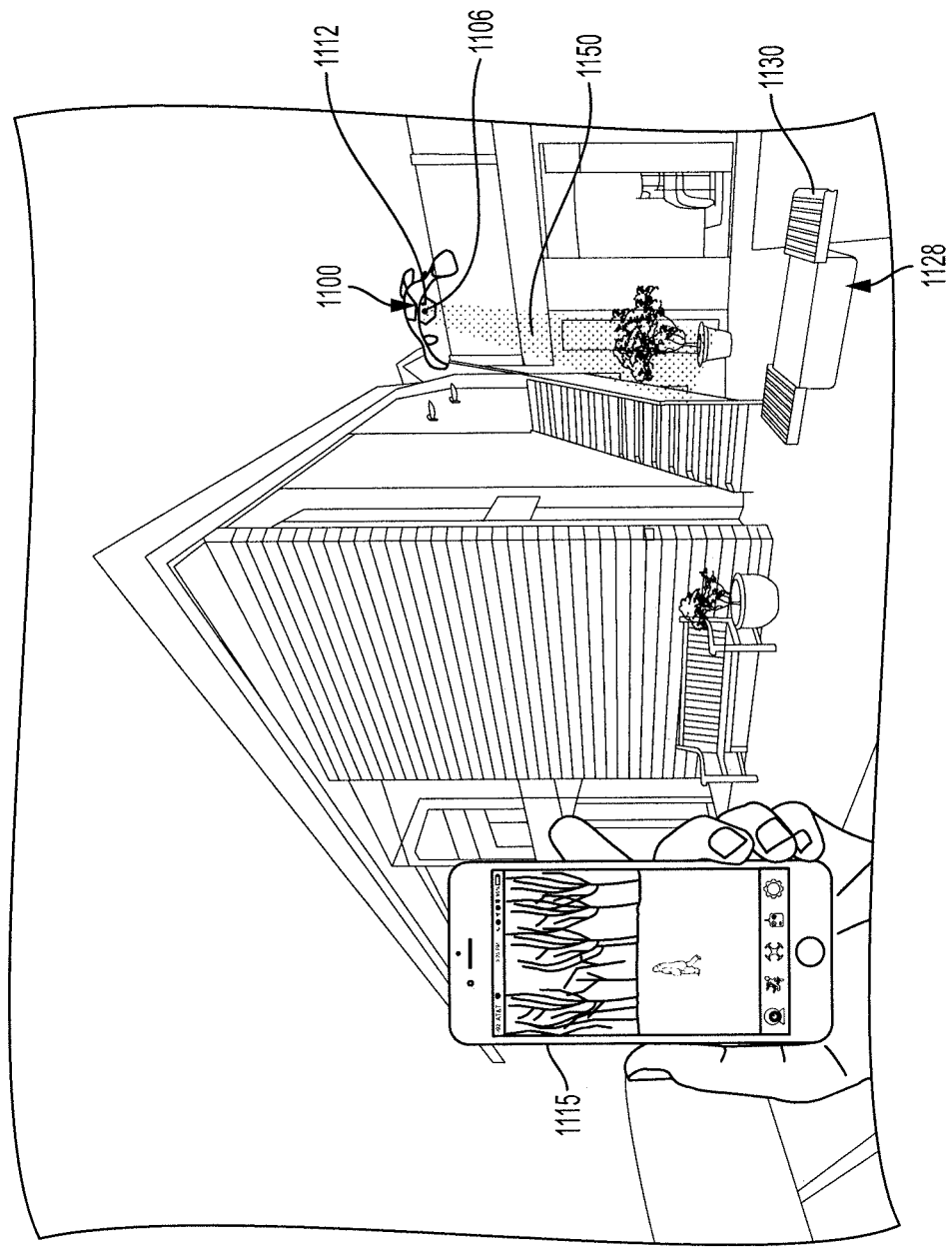
FIG. 11 is a drawing illustrating night vision capabilities of a security drone according to an embodiment of the present disclosure.

Turning to FIG. 11, a security drone 1100 may be designed for use in an outdoor area. The security drone 1100 may further include a drone dock 1128. The drone dock 1128 may wirelessly charge the battery of the security drone 1100. The drone dock 1128 may further include one or more solar panel 1130 capable of receiving sunlight and converting the sunlight into electricity. The drone dock 1128 may include a battery (not shown) for storing the electricity. The drone dock 1128 may transfer the stored electricity (or the electricity directly received via the solar panel 1130) to the security drone 1100.

The security drone 1100 may further include an infrared light source 1112 and a camera 1106. The infrared light source 1112 may output an infrared light 1150. The camera 1106 may detect image data illuminated by the infrared light 1150. The drone processor may transmit the detected image data to a remote device 1115 such that a user can view the predetermined area even when the predetermined area is relatively dark.

Figure 12:
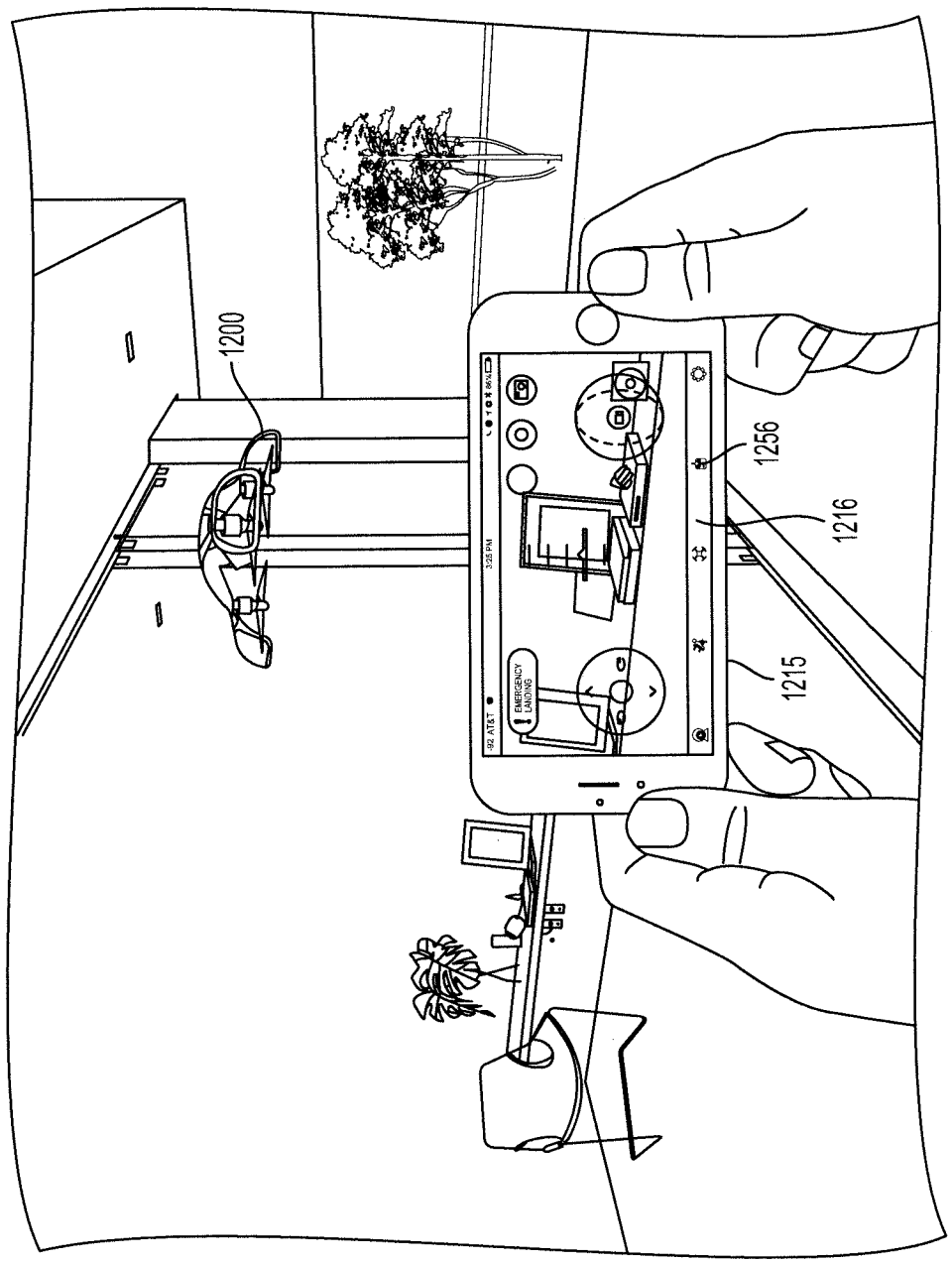
FIG. 12 is a drawing illustrating a remote control feature of an app for controlling movement of a security drone according to an embodiment of the present disclosure.

Referring to FIG. 12, a remote device 1215 may be utilizing the remote control feature 1256 of the app 1216 to control flight of a security drone 1200. As shown, the user may control the orientation, flightpath, and acceleration of the security drone 1200 using the remote control feature 1256.

Figure 13:
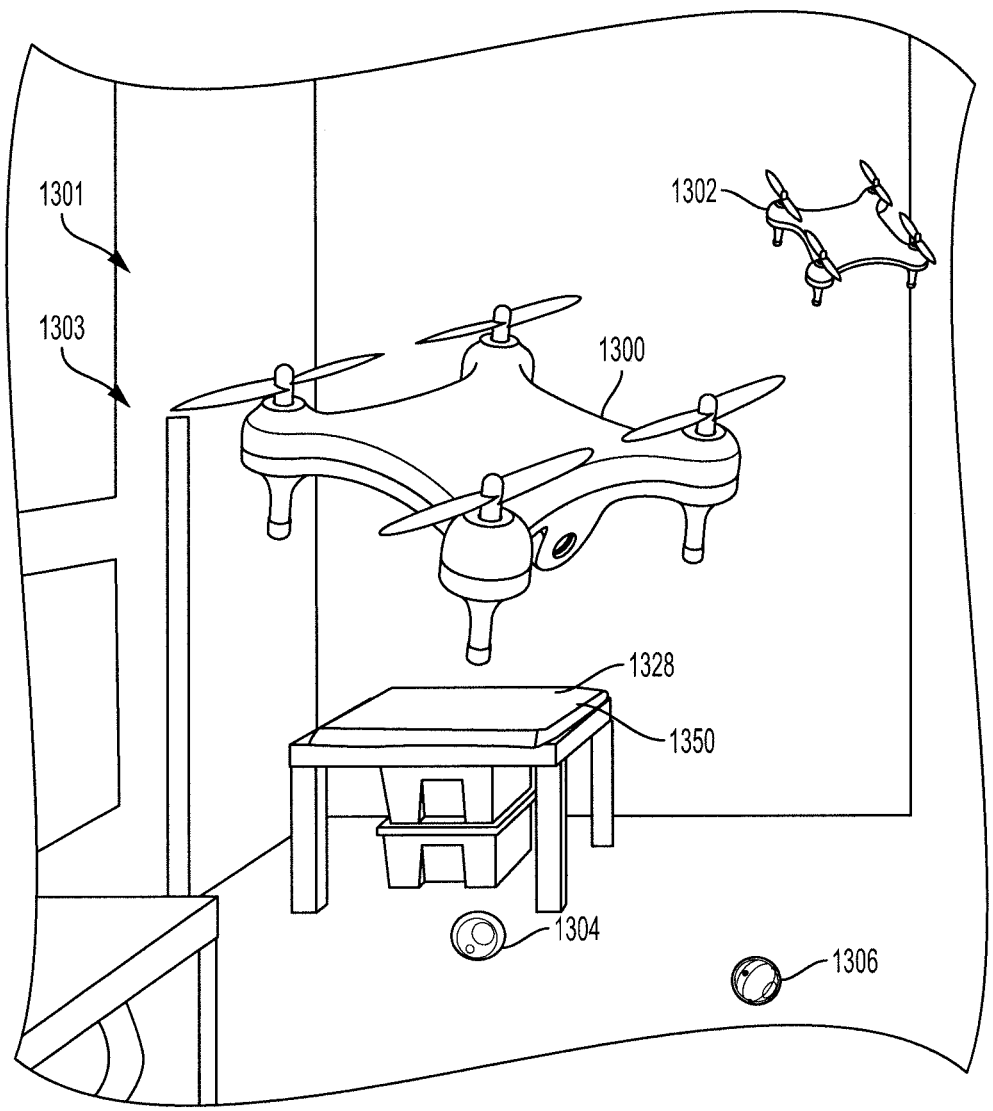
FIG. 13 is a drawing illustrating a charging tile for wireless charging of a security drone according to an embodiment of the present disclosure.

Turning to FIG. 13, a security system 1301 may include a plurality of security drones 1303 including a first security drone 1300, a second security drone 1302, a third security drone 1304, and a fourth security drone 1306. The security system 1301 may further include a drone dock 1328 that includes a wireless charging tile 1350. Each of the security drones 1303 may be capable of receiving electricity wirelessly. In that regard, the wireless charging tile 1350 may output electrical energy that may be received by each of the security drones 1303. The wireless charging tile 1350 may be capable of transmitting the electrical energy for a relatively large distance, such as approximately 30 feet (9.1 meters). In that regard, each of the security drones 1303 may receive electrical energy when located within 30 feet of the wireless charging tile 1350.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A security drone for monitoring a predetermined area comprising:
   a drone housing defining a cavity;
   an actuator coupled to the drone housing and configured to move the drone housing through the predetermined area;
   a camera coupled to the drone housing and configured to detect image data corresponding to the predetermined area as the drone housing moves through the predetermined area;
   a network access device positioned within the cavity and configured to transmit and receive data via a network and to receive a selected swarm option; and
   a drone processor positioned within the cavity, coupled to the actuator, the camera, and the network access device, and configured to:
   control the actuator to move the drone housing through the predetermined area,
   identify a potential threat in the predetermined area based on the image data as the drone housing is moved through the predetermined area,
   control the actuator to move the drone housing relative to the potential threat based on the selected swarm option, and
   identify whether the potential threat is a serious threat or a non-serious threat, transmit potential threat data corresponding to the potential threat to a remote device associated with a user in response to determining that the potential threat is the non-serious threat, and transmit the potential threat data corresponding to the potential threat to authorities in response to identifying that the potential threat is the serious threat.

2. The security drone of claim 1, further comprising a memory positioned in the cavity, coupled to the drone processor, and configured to store route data corresponding to a predetermined route through the predetermined area, wherein the drone processor is further configured to control the actuator to move the drone housing along the predetermined route based on the stored route data.

3. The security drone of claim 2, wherein the memory is further configured to store at least one predetermined patrol time corresponding to a time of day at which the drone housing should patrol the predetermined area, and the drone processor is further configured to control the actuator to move the drone housing along the predetermined route at the stored at least one predetermined patrol time.

4. The security drone of claim 1, wherein the network access device is further configured to receive movement instructions from the remote device and the drone processor is configured to move the drone housing through the predetermined area based on the received movement instructions.

5. The security drone of claim 1, wherein:
   the network access device is further configured to receive motion data from at least one motion sensor positioned in the predetermined area, the motion data corresponding to detected motion at a specific location within the predetermined area; and
   the drone processor is further configured to control the actuator to move the drone housing to the specific location to cause the image data to correspond to the specific location when the network access device receives the motion data from the at least one motion sensor.

6. The security drone of claim 5, wherein the drone processor is configured to control the actuator to operate in each mode listed below based on user input received via the network access device:
   a home mode in which the drone processor controls the actuator to cause the drone housing to remain in a single location regardless of the motion data;
   a night mode in which the drone processor controls the actuator to cause the drone housing to remain in the single location and to cause the drone housing to move to the specific location when the network access device receives the motion data; and
   an away mode in which the drone processor controls the actuator to cause the drone housing to patrol through the predetermined area at least once and to cause the drone housing to move to the specific location when the network access device receives the motion data.

7. The security drone of claim 1, further comprising:
   a drone dock coupled to a power source and having an output power port configured to transmit electrical power;
   a battery positioned within the cavity and configured to store the electrical power; and
   an input power port coupled to the drone housing and electrically coupled to the battery and configured to receive the electrical power from the drone dock and to transmit the electrical power to the battery,
   wherein the drone processor is further configured to monitor a current battery status of the battery and to control the actuator to move the drone housing to the drone dock to cause the input power port to receive the electrical power from the drone dock when the current battery status reaches or drops below a predetermined charge level.

8. The security drone of claim 7, further comprising a dock transmitter coupled to the drone dock and configured to transmit a dock beacon, wherein the network access device is configured to receive the dock beacon and the drone processor is configured to control the actuator to move the drone housing to the drone dock based on the received dock beacon.

9. The security drone of claim 1, wherein:
   the network access device is configured to communicate via an IEEE 802.11 protocol and via a cellular protocol;
   the network access device is configured to receive a Wi-Fi signal from an access point via the IEEE 802.11 protocol;

the drone processor is further configured to determine a location of the drone housing within the predetermined area based on the received Wi-Fi signal; and the drone processor is further configured to transmit the potential threat data to the remote device via the IEEE 802.11 protocol in response to communications via the IEEE 802.11 protocol being available and to transmit the potential threat data to the remote device via the cellular protocol in response to communications via the IEEE 802.11 protocol being unavailable.

10. The security drone of claim 1, further comprising at least one proximity sensor coupled to the drone housing and configured to detect presence of objects within the predetermined area, wherein the drone processor is further configured to control the actuator to move the drone housing through the predetermined area without making contact with the objects based on the detected presence of the objects.

11. The security drone of claim 1, wherein the drone processor is configured to control the drone housing to perform at least one of the below actions, potentially regarding a predetermined distance, when the potential threat is identified:
control the actuator to cause the drone housing to orient the camera towards the potential threat and to maneuver in an orbit around the potential threat;
control the actuator to cause the drone housing to orient the camera towards the potential threat and to maneuver within the predetermined distance of the potential threat; or
control the actuator to cause the drone housing to orient the camera towards the potential threat and to remain at least the predetermined distance away from the potential threat.

12. The security drone of claim 1, further comprising a microphone coupled to the drone housing and to the drone processor and configured to receive local audio data and a speaker coupled to the drone housing and to the drone processor and configured to output remote audio data, wherein the network access device is further configured to output the remote audio data received from the remote device via the speaker and to transmit the local audio data received via the microphone to the remote device.

13. The security drone of claim 1, further comprising:
a light sensor coupled to the drone housing and the drone processor and configured to detect an ambient amount of light; and
an infrared light source coupled to the drone housing and to the drone processor and configured to output infrared light,
wherein:
the drone processor is further configured to control the infrared light source to output the infrared light when the detected ambient amount of light is less than a threshold amount of light, and
the camera is further configured to detect infrared image data when the infrared light source outputs the infrared light.

14. The security drone of claim 1, wherein the drone processor is configured to control the actuator to cause the drone housing to orbit around the potential threat in response to the selected swarm option being a first option, to control the actuator to cause the drone housing to maneuver within a predetermined distance of the potential threat in response to the selected swarm option being a second option, and to control the actuator to cause the drone housing to remain at least the predetermined distance away from the potential threat in response to the selected swarm option being a third option.

15. A security drone for monitoring a predetermined area comprising:
a drone housing defining a cavity;
an actuator coupled to the drone housing and configured to move the drone housing through the predetermined area;
a camera coupled to the drone housing and configured to detect image data corresponding to the predetermined area as the drone housing moves through the predetermined area;
a network access device positioned within the cavity and configured to transmit and receive data via a network;
a memory configured to store route data corresponding to a predetermined route through the predetermined area; and
a drone processor positioned within the cavity, coupled to the actuator, the camera, and the network access device, and configured to:
control the actuator to move the drone housing along the predetermined route,
identify a potential threat in the predetermined area based on the image data as the drone housing is moved through the predetermined area,
determine a selected swarm option,
control the actuator to move the drone housing relative to the potential threat based on the selected swarm option,
identify whether the potential threat is a serious threat or a non-serious threat, transmit potential threat data corresponding to the potential threat to a remote device associated with a user in response to determining that the potential threat is the non-serious threat, and transmit the potential threat data corresponding to the potential threat to authorities in response to identifying that the potential threat is the serious threat.

16. The security drone of claim 15, wherein the memory is further configured to store at least one predetermined patrol time corresponding to a time of day at which the drone housing should patrol the predetermined area, and the drone processor is further configured to control the actuator to move the drone housing along the predetermined route at the stored at least one predetermined patrol time.

17. The security drone of claim 15, further comprising:
a light sensor coupled to the drone housing and the drone processor and configured to detect an ambient amount of light; and
an infrared light source coupled to the drone housing and to the drone processor and configured to output infrared light,
wherein:
the drone processor is further configured to control the infrared light source to output the infrared light when the detected ambient amount of light is less than a threshold amount of light, and
the camera is further configured to detect infrared image data when the infrared light source outputs the infrared light.

18. The security drone of claim 17, wherein the memory is further configured to store at least one predetermined patrol time corresponding to a time of day at which the drone housing should move along the predetermined route, wherein the drone processor is further configured to control the actuator to move the drone housing along the predetermined route at the stored at least one predetermined patrol time.

19. A security system for monitoring a predetermined area, comprising:
   at least one motion sensor positioned in the predetermined area and configured to detect motion data corresponding to detected motion at a specific location within the predetermined area; and
   a security drone having:
      a drone housing defining a cavity,
      an actuator coupled to the drone housing and configured to move the drone housing through the predetermined area,
      a camera coupled to the drone housing and configured to detect image data corresponding to the predetermined area as the drone housing moves through the predetermined area,
      a microphone configured to detect audio data while in the predetermined area,
      a network access device configured to transmit and receive data via a network and to receive a selected swarm option, and
      a drone processor positioned within the cavity, coupled to the actuator, the camera, and the network access device, and configured to:
         control the actuator to move the drone housing to the specific location;
         identify a potential threat in the specific location based on the image data and the audio data,
         control the actuator to move the drone housing relative to the potential threat based on the selected swarm option, and
         identify whether the potential threat is a serious threat or a non-serious threat, transmit potential threat data corresponding to the potential threat to a remote device associated with a user in response to determining that the potential threat is the non-serious threat, and transmit the potential threat data corresponding to the potential threat to authorities in response to identifying that the potential threat is the serious threat.

20. The security system of claim 19, wherein the drone processor is configured to control the actuator to operate in each mode listed below based on user input received via the network access device:
   a home mode in which the drone processor controls the actuator to cause the drone housing to remain in a single location regardless of the motion data;
   a night mode in which the drone processor controls the actuator to cause the drone housing to remain in the single location and to cause the drone housing to move to the specific location when the network access device receives the motion data; and
   an away mode in which the drone processor controls the actuator to cause the drone housing to patrol through the predetermined area at least once and to cause the drone housing to move to the specific location when the network access device receives the motion data.

* * * * *